(12) United States Patent
Förnsel et al.

(10) Patent No.: US 6,265,690 B1
(45) Date of Patent: Jul. 24, 2001

(54) PLASMA PROCESSING DEVICE FOR SURFACES

(75) Inventors: Peter Förnsel, Spenge; Christian Buske, Steinhagen, both of (DE)

(73) Assignee: Cottin Development Ltd., Zurich (CH)

( * ) Notice: Subject to any disclaimer, the term of this patent is extended or adjusted under 35 U.S.C. 154(b) by 0 days.

(21) Appl. No.: 09/445,016

(22) PCT Filed: Apr. 1, 1999

(86) PCT No.: PCT/EP99/02256

§ 371 Date: Apr. 20, 2000

§ 102(e) Date: Apr. 20, 2000

(87) PCT Pub. No.: WO99/52333

PCT Pub. Date: Oct. 14, 1999

(30) Foreign Application Priority Data

Apr. 3, 1998 (DE) ......................................... 298 05 999 0 U

(51) Int. Cl.⁷ ...................................................... B23K 9/00
(52) U.S. Cl. ................. 219/121.5; 219/121.39; 219/121.52
(58) Field of Search ........................... 219/121.5, 121.59, 219/121.39, 121.51, 121.67, 121.52, 121.84, 121.43, 121.44, 121.48; 123/143 B; 427/455, 577; 373/18

(56) References Cited

U.S. PATENT DOCUMENTS

| 4,896,016 | * | 1/1990 | Broberg et al. ................... 219/121.5 |
| 4,912,296 | * | 3/1990 | Schlienger ....................... 219/121.59 |
| 4,969,432 | * | 11/1990 | Scharnweber et al. ......... 123/143 B |
| 5,043,554 | * | 8/1991 | Kohsaka et al. ................ 219/121.39 |
| 5,208,442 | * | 5/1993 | Ahola et al. .................... 219/121.52 |
| 5,317,126 | * | 5/1994 | Couch, Jr. et al. ............. 219/121.51 |
| 5,539,176 | * | 7/1996 | Ikegaya et al. ................. 219/121.59 |
| 5,548,611 | * | 8/1996 | Cusick et al. .......................... 373/18 |
| 5,837,958 |   | 11/1998 | Förnsel .............................. 219/121.5 |

FOREIGN PATENT DOCUMENTS 298 05 999 U   8/1998  (DE) .
WO93/13905     7/1993  (WO) .

* cited by examiner

Primary Examiner—Teresa Walberg
Assistant Examiner—Quang Van
(74) Attorney, Agent, or Firm—Burns, Doane, Swecker & Mathis, LLP

(57) ABSTRACT

A mechanism for plasma surface treatment includes a rotating head having at least one eccentrically disposed plasma nozzle for generating a plasma jet directed in parallel with the axis of rotation. The nozzle includes a swirl system for swirling the plasma jet.

9 Claims, 2 Drawing Sheets

PLASMA PROCESSING DEVICE FOR SURFACES

BACKGROUND OF THE INVENTION

The invention relates to an apparatus for plasma treatment of surfaces. More particularly, the invention relates to a pretreatment enabling the coating of surfaces of synthetic resin materials with adhesives, printing inks and the like. Such a pretreatment is necessary because the surfaces of synthetic resins can normally not be wetted with liquids and do therefore not accept the printing ink or the adhesive. The pretreatment changes the surface structure of the synthetic resin so that it becomes wettable with liquids having a comparatively large surface tension. The surface tension of the liquids with which the surface can still be wetted is an indictor for the quality of the pretreatment.

A well established method for the pretreatment of synthetic resin surfaces is based on the principle of corona discharge. In this method the resin to be treated is typically passed through between two electrodes which are coated with a ceramic material and to which a high voltage with high frequency is applied so that a corona discharge occurs through the synthetic resin material. However, this method is suitable only for relatively thin workpieces having a flat surface, such as plastic foils.

DE 195 32 112 A discloses an apparatus for pretreatment of surfaces by means of a plasma jet. Thanks to a specific construction of the plasma nozzle a relatively cool but nevertheless highly reactive plasma jet is achieved which has a shape and dimensions similar to those of a flame of a candle and, as a consequence, permits also the pretreatment of profiles having relatively deep recesses. Due to the high reactivity of the plasma jet a short pretreatment time is sufficient, so that the workpiece can be passed along the plasma jet with a relatively high velocity. Thus, as a result of the comparatively low temperature of the plasma jet, a pretreatment of heat-sensitive plastic materials is also possible. Since no counter electrode is necessary on the back side of the workpiece, it is also possible to pretreat the surfaces of arbitrarily thick block-like workpieces, hollow bodies, and the like. For a uniform pretreatment of larger surfaces, the cited publication discloses an array of a plurality of staggered plasma nozzles. In this case, however, relatively high expenses are necessary for the equipment.

OBJECTS AND SUMMARY OF THE INVENTION

It is an object of the invention to provide an apparatus for plasma surface treatment which permits a rapid and efficient pretreatment of larger surfaces at low equipment expenses. This object is achieved by an apparatus which comprises a rotating head which has at least one excentrically disposed plasma nozzle for generating a plasma jet directed in parallel with the axis of rotation.

When the workpiece is moved relative to the rotating head which rotates with a high speed of revolution, the plasma jet sweeps a stripe-shaped surface zone of the workpiece, and the width of this zone corresponds to the diameter of the circle described by the revolving plasma nozzle. Thus, a comparatively large surface can be pretreated in a rational way.

In this context, it is tolerable that the intensity of the pretreatment in the stripe being swept is not completely uniform. The parameters of the pretreatment, especially the speed of revolution of the rotating head and the translational speed of the workpiece relative to the rotating head can, within broad ranges, always be selected such that a sufficient wettability of the workpiece is achieved everywhere in the pretreated stripe and, on the other hand, the material is not thermally damaged in the zones which have been treated most intensively.

Thanks to the long range of the plasma jet, the pretreated surface of the workpiece can also be curved or profiled. Thus, the apparatus is also suitable for example for the pretreatment of frame profiles for windows or doors made of plastics, plastic bottles or buckets, and the like.

It has been found to be particularly useful in the apparatus according to the invention that the rotation of the head and the corresponding rotation of the plasma jet creates an extended vortex and, as a result, a low pressure is formed in the center of the vortex. This low pressure counteracts a radial escape of the plasma jet and has the effect that the plasma jet is "sucked" to the surface of the workpiece, so that it comes into intimate contact with the surface of the workpiece.

Preferably, two or more plasma jets are mounted to the rotating head with uniform angular spacings, so that at least two plasma jets are operating and the treatment time is shortened correspondingly. This arrangement has also the advantage that the rotating head is substantially balanced due to the symmetric arrangement of the plasma nozzles.

Thanks to the high speed of revolution of the rotating head, which may amount to, for example, 1000 min$^{-1}$ or more, Coriolis forces and the like lead to a swirl in the plasma jets exiting from the individual plasma nozzles. In addition, each plasma nozzle preferably has its own swirl arrangement which assures a stabilisation and focusing of the plasma jet. The sense of rotation of the rotating head should in this case be adapted to the sense of the swirling movement in the individual plasma nozzles.

BRIEF DESCRIPTION OF THE DRAWINGS

An embodiment of the invention will now be explained in conjunction with the drawings, in which.

DETAILED DESCRIPTION OF A PREFERRED EMBODIMENT OF THE INVENTION

Figure 1:
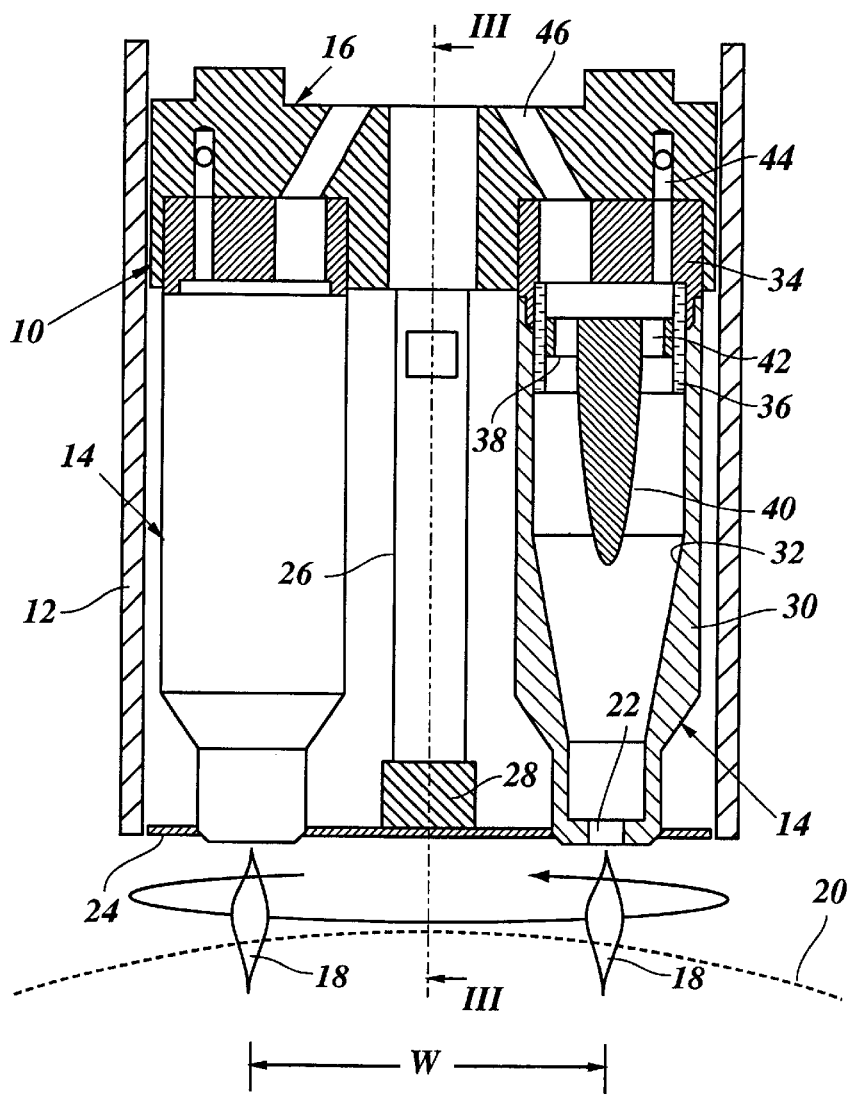
FIG. 1 is an axial section of a rotating head.

FIG. 1 shows a rotating head 10 which rotates about its central axis, which is the vertical axis in FIG. 1, and is surrounded by a stationary cylinder 12 serving as a protecting shield. The rotating head 10 has two diametrically opposed plasma nozzles 14 mounted to an annular distributor block 16 and arranged to emit plasma jets 18 in a direction in parallel with the axis of rotation. When the head 10 is moved relative to the surface of a workpiece 20 in a direction normal to the plane of the drawing in FIG. 1 and rotates with a high speed of revolution, the plasma jets 18 sweep relatively uniformly over a stripe on the surface of the workpiece having a width W of, for example, 8 cm.

The mouths 22 of the plasma nozzles are disposed in a common plane in a face plate 24 which is held co-rotatably at the distributor block 16 by two bars 26. The bars 26 are disposed in a plane normal to the plane of the plasma nozzles 14 and are connected with one another at the face plate 24 by a cross piece 28.

Each plasma nozzle 14 has an essentially cylindrical metal casing 30 tapered towards the mouth 22 and forming a vortex channel 32 conically tapered towards the mouth 22. The mouth 22 of the plasma nozzle is again significantly restrained in comparison to the internal cross section of the vortex channel 32. The upstream end of the casing 30 is rigidly connected to an adapter 34 made of metal and embedded in the distributor block 16. A ceramic tube 36 is coaxially disposed in the adapter 34 and the end of the casing 30 adjacent thereto and accommodates a swirl ring 38 which is eclectically insulated from the adapter 34 and the casing 30. The swirl ring 38 forms an electrode pin 40 which projects into the vortex channel 32 and is surrounded by a crest of swirl orifices 42. The adapters 34 and the distributor block 16 are formed with gas passages 44 for supplying working gas to the plasma nozzles. The adapters 34 and the distributor block 16 further comprise cable passages 46 for high voltage cables which have not been shown and by which a voltage is applied to the swirl rinds 36 and the electrode pins 40 respectively connected therewith.

When the apparatus is in operation, pressurised air is supplied as a working gas via the gas passages 44. The pressurised air passes through the swirl orifices 42 of the swirl ring 38 and is swirled thereby so that it flows through the vortage channel 32 to the mouth 22 of the plasma nozzle in a vortex fashion. An AC voltage of several kV having a frequency of, for example, 20 kHz is applied to the electrode pin 40, whereas the casing 30 of the plasma nozzle is grounded via the distributor ring 16. When the voltage is switched on, the high frequency at first creates a corona discharge between the swirl ring 38 and the ceramic tube 36 serving as a dielectricum. This corona discharge then ignites an arc discharge between the electrode pin 40 and the casing 30. The electric arc will however not pass radially from the electrode pin 40 to the surrounding wall of the casing 30, but is instead entrained by the swirling gas flow and is channelled in the core of the gas vortex, so that it passes from the electrode pin 40 straight along the central axis of the vortex channel 32 to the mouth 22, and it is only then that it is radially branched towards the edge of the mouth. This has the desired result that a highly reactive and well focused plasma jet is formed which nevertheless is relatively cool and, in addition, thanks to its swirling motion, will excellently mate with the surface of the workpiece 20.

Figure 2:
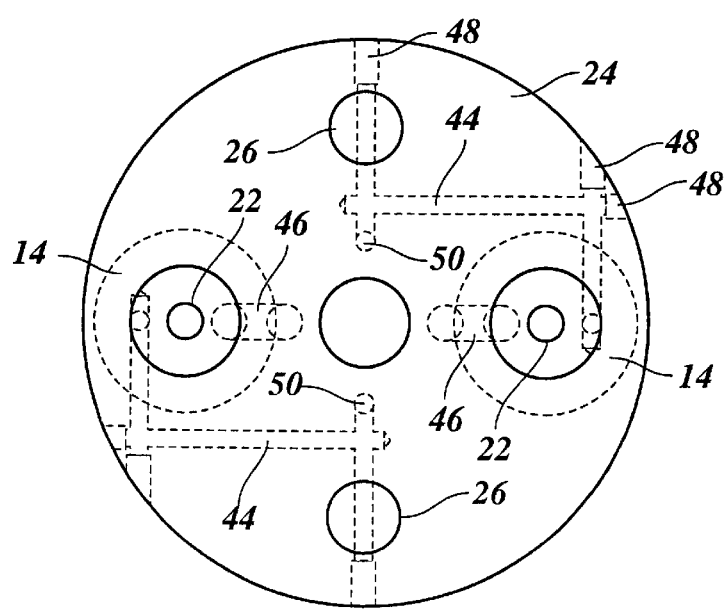
FIG. 2 is a front view of the rotating head.

FIG. 2 shows the arrangement of the gas passages 44 in the distributor block 16. The gas passages are formed by a system of bores crossing one another and respectively closed by plugs 48 at their outer ends and each connecting an axial inlet passage 50 with an associated one of the plasma nozzles 14.

Figure 3:
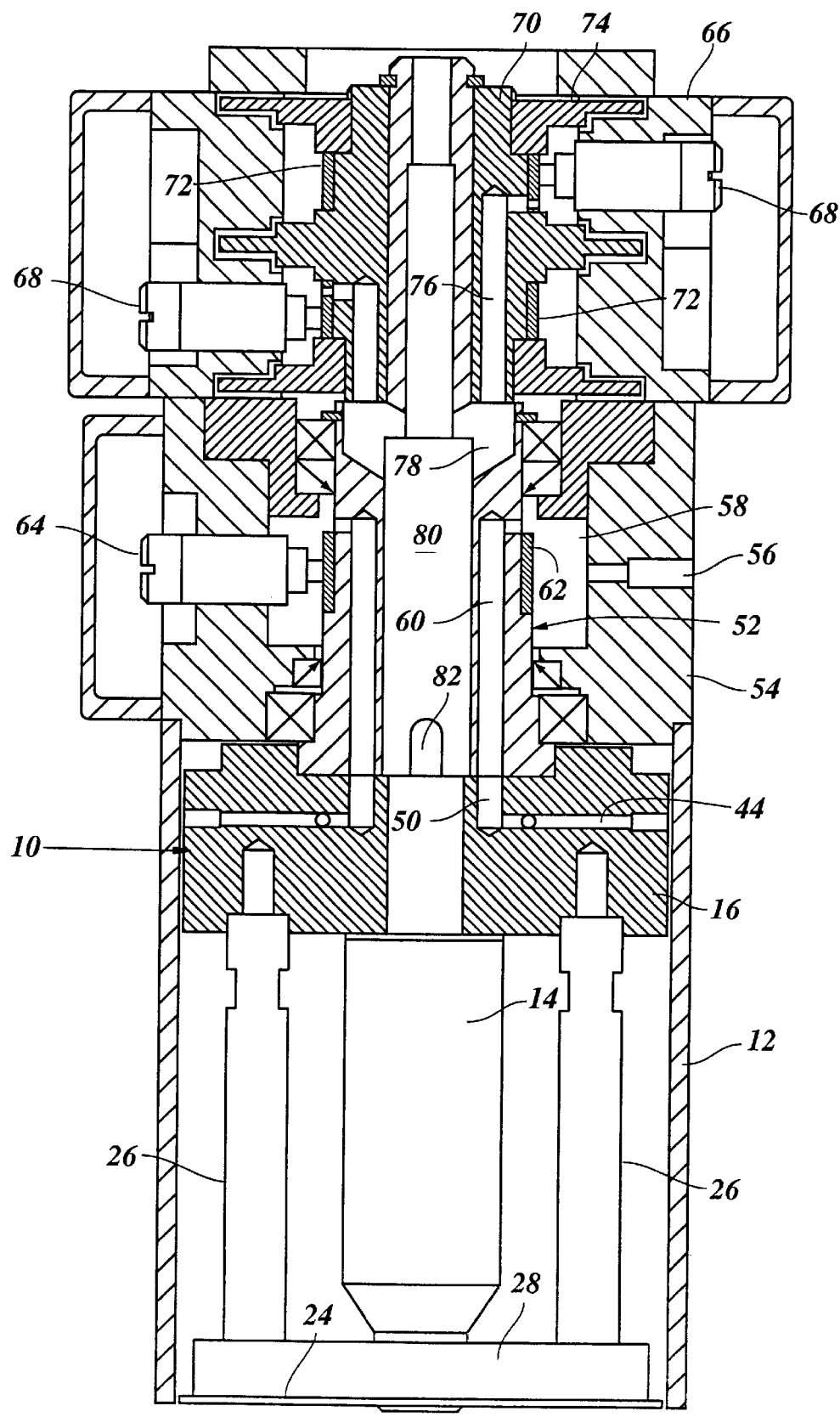
FIG. 3 is an axial section through the whole apparatus corresponding to the plane III—III in FIG. 1.

As is shown in FIG. 3, the distributor block 16 is mounted to a thickened end of a shaft 52 which is rotatably supported in a bearing housing 54. The bearing housing 54 has an inlet port 56 for compressed air leading to a pressure chamber 58 through which the shaft 52 passes. The pressure chamber 58 is hermetically sealed by a pressure-tight construction of the bearings for the shaft 52. The shaft 52 has two excentric, axial gas passages 60 connected at one end to the pressure chamber 58 and at the other end to the above-mentioned axial passages 50 of the distributor block 16. Thus, pressurised air is supplied to the plasma nozzles 14 of the rotating head 10 via the inlet port 56.

Inside of the pressure chamber 58 the shaft 52 carries a collector ring 62 which is in sliding engagement with a wiper contact 64. This wiper contact assures the grounding of the shaft 52 and the distributor block 16 as well as the casings of the plasma nozzles 14 connected thereto.

A connector housing 66 is adjoined to the bearing housing 54 on the side opposite to the rotating head 10 and accommodates two insulated wiper contacts 68 for the high voltage supply of the plasma nozzles 14. An extension of the shaft 52 projecting into the connector housing 66 carries an insulator 70 on which two collector rings 72 are disposed which are each in engagement with one of the wiper contacts 68. The collector rings 72 are electrically insulating from one another and from the shaft 52 and the connector housing 66 by the insulator 70 which is formed with radially projecting disks 74. In addition, the insulator 70 has two axial cable passages 76 which each pass from one of the collector rings 72 to the end face of the insulator 70 engaging a shoulder of the shaft 52. Recesses 78 formed in this shoulder connect the cable passages 76 to a center bore 80 of the shaft 52. The opposite end of this center bore 80 is connected by radial recesses 82 to the cable passages 76 of the distributor block 16 shown in FIG. 1. Thus, it is possible to electrically connect the collector rings 72 with the swirl rings 38 and electrode pins 40 of the plasma nozzles 14 by means of the high voltage cables mentioned above. The separate electric supply lines for the two plasma nozzles make it possible to supply to each plasma nozzle a high voltage from a separate high voltage source. This is essential for being able to supply the necessary ignition voltage for igniting one of the plasma nozzles even when an arc discharge is already occurring in the other plasma nozzle.

What is claimed is:

1. Apparatus for plasma surface treatment, comprising a rotatable head having at least one eccentrically disposed plasma nozzle for generating a plasma jet directed in parallel with the axis of rotation.

2. Apparatus according to claim 1, wherein a plurality of the plasma nozzles are arranged at even angular spacings around the axis of rotation.

3. Apparatus according to claim 2, wherein each plasma nozzle has a swirl system for swirling the plasma jet.

4. Apparatus according to claim 3 wherein each plasma nozzle has an elongated casing defining a grounded electrode and forming an elongated vortex channel accommodating the swirl system and including a mouth through which an electric arc exits the nozzle, the channel being tapered toward the mouth, and wherein each plasma nozzle further has a high voltage electrode disposed in the channel, the swirl system and the vortex channel arranged such that an electric arc discharge from the high voltage electrode is channeled in a vortex core extending along a central axis of the vortex channel and branched to the casing only when reaching the mouth.

5. Apparatus according to claim 1 wherein each plasma nozzle has a swirl system for swirling the plasma jet.

6. Apparatus according to claim 1 wherein the plasma nozzle is powered by a high frequency voltage.

7. Apparatus according to claim 6, wherein the plasma nozzle has a dielectric member separating the grounded electrode and the high voltage electrode from one another and permitting a corona discharge serving as an ignition discharge.

8. Apparatus according to claim 1, wherein the plasma nozzle is mounted to a distributor block having gas passages and cable passages for respectively supplying a working gas and an operating voltage to the plasma nozzle, the block mounted to one end of a shaft which passes through a pressure chamber into which the working gas is supplied, and which also passes through a connector housing and is provided with collector rings inside of the connector housing, the shaft having axial gas and cable passages for connection with corresponding passages in the distributor block.

9. Apparatus according to claim 8, wherein the shaft is journaled in a bearing housing forming the pressure chamber and freely projects into the contact housing disposed on a side of the bearing housing disposed opposite to the rotating head.

* * * * *